Oct. 30, 1962     L. W. CORBETT     3,061,538
ASPHALT COMPOSITION AND PROCESS FOR PREPARING SAME
Filed May 16, 1958
EFFECT OF SEBACIC ACID UPON THE SOFTENING POINT
AND PENETRATION OF PETROLEUM ASPHALT
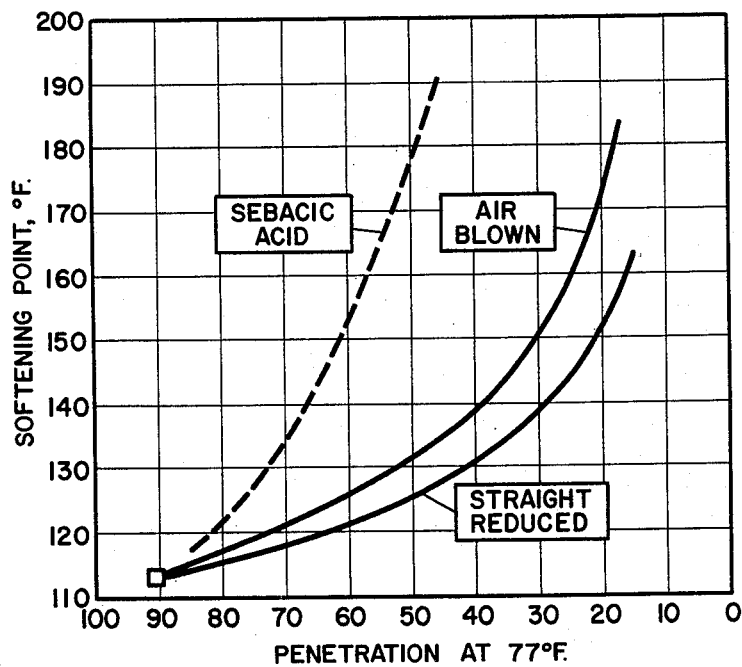
LUKE W. CORBETT    INVENTOR
BY Richard W. Nagel
ATTORNEY

United States Patent Office 3,061,538
Patented Oct. 30, 1962

3,061,538
ASPHALT COMPOSITION AND PROCESS
FOR PREPARING SAME
Luke W. Corbett, Westfield, N.J., assignor to Esso Research and Engineering Company, a corporation of Delaware
Filed May 16, 1958, Ser. No. 735,890
20 Claims. (Cl. 208—44)

The present invention relates to improved asphalts and more particularly relates to an improved petroleum asphalt prepared by the reaction of a minor amount of a saturated aliphatic dicarboxylic acid or an anhydride or halide of such acid with a petroleum asphaltic material.

Petroleum asphalts are generally prepared from petroleum residual oils obtained by the distillation of an asphaltic or semi-asphaltic crude oil or thermal tar or by the fluxing of harder residual asphalts with heavy petroleum distillates. Such residual oils are high boiling liquids or semi-solids which may have softening points from about 32° F. to about 120° F. and are generally characterized by specific gravities ranging from about 0.85 to about 1.07 at 77° F. Other properties of such residual oils, normally termed asphalt bases or asphalt fluxes, may vary to a considerable extent depending upon the particular crude oil from which they are derived.

Asphalts prepared from residual oils such as those set forth above may be classified as either straight reduced asphalts or as oxidized asphalts. Straight reduced asphalts are produced by the steam distillation, vacuum distillation, blending, or solvent deasphalting of residual oils. These operations remove a significant quantity of the lower boiling, more volatile material present in the residual oils and result in a product having a softening point between about 100° and about 170° F. Although higher softening points could be obtained by further treatment of the asphalt flux, straight run asphalts having softening points in excess of about 170° F. are characterized by extremely low penetration and ductility values and hence are too brittle to be of practical application generally. Straight reduced asphalts are generally used for paving and in related applications wherein weathering properties and those related to resistance to flow are not critical.

Oxidized asphalts are produced by contacting a residual oil with air or a similar oxidizing agent, alone or in the presence of an oxidizing catalyst such as ferric chloride, phosphorus pentoxide or the like. The oxidation process serves to dehydrogenate certain constituents of the asphalt, leading to the evolution of water and some carbon dioxide. Oily constituents are thus converted into resins and resins are converted into asphaltenes. Very little oil is removed during the oxidation operation. The penetration and ductility properties of oxidized asphalts are generally somewhat higher for a given softening point than are those of the straight reduced products. In many cases, however, these properties are too low to permit the use of very high softening point oxidized asphalts in applications where high penetration and ductility are required. Aplications in which high softening points coupled with high penetration and ductility values are particularly desirable include the construction of canal linings and builtup roofs by the lamination of saturated felts with hot asphalt; the manufacture of asphalt shingles, roll roofing, siding, laminated papers and fabrics, insulating backing, asphalt tile and similar materials; and the preparation of caulking compounds, electrical insulating materials, waterproofing compounds, rubber compositions and other formulations.

The present invention provides a class of new and improved petroleum asphalts which are not subject to many of the limitations and disadvantages of petroleum asphalts which have been available heretofore. In accordance with the invention, it has now been discovered that certain saturated aliphatic dicarboxylic acids, and anhydrides and halides of such acids can be reacted with petroleum asphaltic materials to produce asphalts which have considerably higher penetration and ductility properties for a given softening point than do conventional asphalts, are more stable than asphalts available in the past, and are less susceptible to the effects of temperature than are asphalts disclosed heretofore. The invention thus makes available a new and improved class of petroleum asphalts which are suitable for a wide variety of applications and provides a method for producing such asphalts which is simpler, more economical and more effective than processes utilized heretofore for the production of high quality petroleum asphalts.

The dicarboxylic acids and anhydrides and halides of such acids which are employed for the production of superior petroleum asphalts in accordance with the invention may be represented by the following empirical formula:

where $n$ is a digit from 2 to 12 inclusive, X is a halogen atom, $x$ is a digit from 0 to 1 inclusive, $y$ is a digit from 0 to 1 inclusive, $z$ is a digit from 0 to 1 inclusive, and $x+y+z=1$. The materials defined by this formula include succinic acid, glutaric acid, adipic acid, pimelic acid, suberic acid, azelaic acid, sebacic acid, brassic acid, brassylic acid and anhydrides, chlorides, bromides, fluorides and iodides of such acids. Acids, anhydrides and halides containing a total of from about 6 to about 10 carbon atoms per molecule are preferred for use in accordance with the invention and adipic and sebacic acids and derivatives thereof are particularly preferred.

In carrying out the process of the invention, the acids, anhydrides and halides designated above are reacted with a petroleum asphaltic material in minor amounts in order to produce a superior asphalt. In general the quantity of the acid, anhydride or halide employed may range from about 0.1 to about 10% by weight. For most purposes concentrations on the order of from about 0.5 to about 5% by weight are effective and these amounts are therefore preferred.

Reaction of the asphaltic material and the acid, anhydride or halide is carried out by mixing the reactants under conditions such that the additive material disperses in the asphaltic material in liquid form without caking, settling or separating. In most cases it will be necessary to heat the asphaltic material to a temperature in the range of from about 150° to about 550° F. Temperatures below about 150° F. are generally not sufficient to promote reaction between the asphaltic material and the acids, anhydride or halide; while temperatures above about 550° F. serve no useful purpose and may lead to degradation of the asphaltic material. Temperatures between about 250° and about 400° F. have been found to be most effective and are therefore preferred. The reaction time may range from a few minutes to an hour or more, depending upon the temperature employed and the particular properties of the asphaltic material being treated. It is normally preferred to carry out the reaction while stirring or agitating the asphaltic material in order to promote this mixing of the reactants.

The petroleum asphaltic materials which may be improved by treatment with certain dicarboxylic acids and anhydride and halides of those acids in accordance with the invention include residual oils produced as described heretofore, straight reduced asphalts derived from such residual oils, and oxidized asphalts produced by the air-blowing or similar oxidation of such residual oils. It has been found that reaction with the dicarboxylic acids, anhydrides and halides is particularly effective for improving the properties of oxidized asphalts and for this reason it is often preferred to air-blow or otherwise oxidize straight reduced asphalts and residual oils prior to treating them with the reactive agents of the invention. Such treatment should not, however, be confused with oxidation processes wherein a catalyst such as ferric chloride is employed. The improved properties obtained by the treatment of asphalts in accordance with the invention cannot be obtained in conventional air-blowing processes, even though an oxidation catalyst is used.

It is recognized that in the past it has been suggested that petroleum asphalts be reacted with certain acidic materials, including fatty acids and salts of fatty acids, in order to improve their properties. It has been found that the improved asphalts made possible in accordance with the present invention are not obtained by treatment with fatty acids and similar acidic materials proposed for use as asphalt modifying agents in the past.

The nature and objects of the invention can more fully be understood by reference to the following examples.

EXAMPLE 1

Samples of an asphalt base stock derived from Lagunillas crude oil, a Venezuelan crude, were treated with from 1 to 4% of sebacic acid at a temperature of 300° F. for a period of 30 minutes. The treatment was carried by adding the acids to the molten asphalt and agitating the mixture by means of a simple propellor agitator. Upon conclusion of the treatment the asphaltic product was tested to determine its softening point, penetration and ductility. Softening point was determined in accordance with ASTM Method D36–26 by measuring the temperature at which a ⅜" solid steel ball drops through a ⅝" diameter by ¼" thick mold of asphalt held in a standard metal ring. The penetration determination was carried out in accordance with ASTM Method D5–52. This method involves the measurement of the distance in 1/100 of a centimeter that a standard needle will penetrate a sample of the asphalt under specified conditions of load, time and temperature. Penetration values were determined at temperatures of 32° F., 77° F. and 115° F. The ductility test employed is described in ASTM Method D113–44 and consists of determining the distance in centimeters through which a one square centimeter asphalt specimen can be elongated before rupture occurs. A constant elongation of 5 centimeters per minute is used. The penetration index of the asphalt was also determined. This index serves as an indication of the susceptibility of the asphalt to temperature change. A full discussion of the significance of the penetration index as an indication of asphalt properties may be found in "The Properties of Asphaltic Bitumen," by Pfeiffer, page 166, Elsevier Publishing Co., New York, New York, 1950. For purpose of comparison samples of the same asphaltic base stock having a softening equivalent to the same reacted with 4% sebacic acid were prepared by air-blowing and by vacuum distillation in the conventional manner. The data obtained in these tests are shown below.

*Table I*

EFFECT OF SEBACIC ACID ON ASPHALT PROPERTIES

| Asphalt prepared with | 1% sebacic acid | 1¾% sebacic acid | 4% sebacic acid | By air-blowing | By straight reduction |
| --- | --- | --- | --- | --- | --- |
| Softening point, ° F | 132 | 165 | 185 | 185 | 185 |
| Penetration at 77° F | 72 | 56 | 51 | 17 | 6 |
| Penetration at 32° F | 24 | 15 | 18 | 9 | 1 |
| Penetration at 115° F | | 233 | 213 | 36 | 25 |
| Ductility at 77° F | 100 | 100+ | 78 | 3.5 | 0 |
| Penetration index | 1.1 | 3.7 | 5.1 | 2.5 | 0.3 |

The data in the above table clearly indicate that the reaction of an asphaltic material with a saturated asphaltic dicarboxylic acid in accordance with the invention results in an asphalt having much higher penetration and ductility values than asphalts of similar softening points prepared by conventional air-blowing or vacuum distillation. Data from the test described above and similar tests are reproduced in FIGURE 1 and the improved properties made possible by the process of the invention are even more apparent from the figure. The higher penetration indices of the asphalt samples reacted with sebacic acid show that the product prepared in accordance with the invention are less susceptible to temperature change than conventional asphalts.

EXAMPLE 2

A sample of the asphalt base employed in Example 1 above was reacted with 1% sebacyl chloride by heating a mixture of the asphalt and chloride to a temperature of 350° F. and holding it at that temperature for a period of 20 minutes. The resulting product had a softening point of 131° F. Samples of the asphalt base were air-blown at 470° F. to produce an oxidized asphalt having a softening point of 131° F. and vacuum distilled to give a straight reduced asphalt of similar softening point. The properties of the three products thus obtained are set forth in the following table.

*Table II*

EFFECT OF SEBACYL CHLORIDE ON ASPHALT PROPERTIES

| Prepared with | 1% sebacyl chloride | By air-blowing | By straight reduction |
| --- | --- | --- | --- |
| Softening point, °F | 131 | 131 | 131 |
| Penetration at 77° F | 51 | 50 | 40 |
| Penetration at 32° F | 29 | 21 | 9 |
| Ductility at 77° F | 100 | 100 | 100 |
| Penetration index | 0.1 | 0.0 | −0.5 |

Again it can be seen that the use of saturated aliphatic dicarboxylic acids and anhydrides and halides of such acids in accordance with the invention results in an asphaltic product having properties markedly superior to those of asphalts produced in the conventional manner.

EXAMPLE 3

An asphalt flux derived from Taparito crude oil, a Venezuelan crude, and having a softening point of 78° F. was air-blown at a temperature of 470° F. to produce an oxidized asphalt having a softening point of 133° F. This oxidized asphalt was then treated with 1% adipic acid at 325° F. for 25 minutes. The resulting product had a softening point of 167° F. For purposes of comparison, samples of the oxidized asphalt containing no adipic acid were separately air-blown and vacuum distilled to give products of 167° F. softening points. The properties of each of these products are shown below.

*Table III*

EFFECT OF ADIPIC ACID ON ASPHALT PROPERTIES

| Prepared with | 1% adipic acid | By air-blowing | By straight reduction |
| --- | --- | --- | --- |
| Softening point, °F | 167 | 167 | 167 |
| Penetration at 77° F | 52 | 41 | 8 |
| Penetration at 32° F | 28 | 18 | 2 |
| Penetration at 115° F | 107 | 56 | 35 |
| Ductility at 77° F | 12.5 | 3.9 | 0 |
| Volatility at 325° F | 0.14 | 0.02 | 0.0 |
| Vol. res. soft. pt., ° F | 167 | 172 | 170 |
| Vol. res. pen. at 77° F | 51 | 39 | 7 |
| Penetration index | 3.7 | 3.1 | 0.0 |

The above data show that the addition of 1% adipic acid to the oxidized asphalt resulted in a product having properties which were surprisingly better than similar asphalts produced by air-blowing and vacuum distillation. The softening point and penetration of the residue obtained from the volatility test carried out at 325° F. in accordance with ASTM Method D6–39T show that the beneficial effect produced by reaction of the adipic acid with the flux was not lost upon prolonged exposure of the asphalt to high temperature and indicate that asphalts produced in accordance with the invention are suitable for a wide variety of applications.

EXAMPLE 4

An 88° F. softening point asphaltic flux derived from Bachaquero crude oil, also a Venezuelan crude, was air-blown to a softening point of 167° F. and then treated with 1% sebacic acid at a temperature of 300° F. for a period of 1 hour. The product obtained, and asphalts of similar softening point produced from the same flux by air-blowing and vacuum distillation are shown below.

Table IV

EFFECT OF SEBACIC ACID UPON PROPERTIES OF OXIDIZED ASPHALT

| Prepared with | 1% sebacic acid | By air-blowing | By straight reduction |
|---|---|---|---|
| Softening point, °F | 186 | 186 | 186 |
| Penetration at 77° F | 21 | 18 | 0 |
| Penetration at 32° F | 8 | 7 | 0 |
| Penetration at 115° F | 43 | 39 | 4 |
| Ductility at 77° F | 4.5 | 3.6 | 0 |
| Volatility at 325° F | .04 | .04 | 0 |
| Vol. res. soft. pt., °F | 173 | 192 | 189 |
| Vol. res. pen. at 77° F | 23 | 17 | 0 |
| Penetration index | 3.0 | 2.8 | −3.0 |

The above data demonstrate that treatment with dicarboxylic acids and derivatives thereof in accordance with the invention are effective not only on residual oils and straight reduced asphalts but also upon oxidized asphalts. Properties of the asphalt modified by reaction with sebacic acid were appreciably better than those of the product raised to an equivalent softening point by further oxidation.

EXAMPLE 5

A straight reduced asphalt having softening point of 115° F. and a penetration value at 77° F. of about 88 was treated with 1% undecylic acid in order to determine the effect upon asphalts of fatty acids having a molecular weight similar to those of the dicarboxylic acids employed in accordance with the invention. Treatment was carried out at a temperature of 300° F. for 30 minutes wtih constant agitation. It was found that the product had a softening point of 114° F. and a penetration value of 95, indicating that the fatty acid had essentially no effect upon the asphalt. Similar tests were carried out using other fatty acids and unsaturated monocarboxylic acids and again no significant improvement in the properties of the treated asphalt could be detected.

What is claimed is:

1. A process for improving the properties of an asphaltic petroleum fraction having a softening point above about 32° F. which comprises reacting with said fraction from about 0.1 to about 10% by weight of a compound of the formula $$CnH_{2n}[CO(OH)_x(X)_y]_2O_z$$

where $n$ is a digit from 2 to 12 inclusive, X is a halogen atom, $x$ is a digit from 0 to 1 inclusive, $y$ is a digit from 0 to 1 inclusive, $z$ is a digit from 0 to 1 inclusive, and $x+y+z=1$.

2. A process as defined by claim 1 wherein said fraction has a softening point in the range of about 100° to 170° F. and said compound is reacted with said fraction at a temperature between about 150 and about 550° F.

3. A process as defined by claim 1 wherein said compound is a dicarboxylic acid.

4. A process as defined by claim 1 wherein said compound is an acid anhydride of a dicarboxylic acid.

5. A process as defined by claim 1 wherein said compound is a halide of a dicarboxylic acid.

6. An improved petroleum asphalt prepared by reacting an asphaltic petroleum fraction having a softening point above about 32° F. with from about 0.1 to about 10% by weight of a compound of the formula $$CnH_{2n}[CO(OH)_x(X)_y]_2O_z$$

where $n$ is a digit from 2 to 12 inclusive, X is a halogen atom, $x$ is a digit from 0 to 1 inclusive, $y$ is a digit from 0 to 1 inclusive, $z$ is a digit from 0 to 1 inclusive, and $x+y+z=1$.

7. A process for improving the properties of an asphaltic petroleum fraction having a softening point above about 32° F. and a specific gravity above about 0.85 at 77° F. which comprises reacting with said fraction from about 0.1 to about 10% by weight of a saturated aliphatic dicarboxylic acid containing from 4 to 14 carbon atoms per molecule at a temperature in the range of from about 150° to about 550° F.

8. A process as defined by claim 7 wherein said acid is sebacic acid.

9. A process as defined by claim 7 wherein said acid is adipic acid.

10. A process as defined by claim 7 wherein about 0.5 to about 5% by weight of said acid is reacted with said asphaltic fraction.

11. A process as defined by claim 7 wherein said acid is reacted with said asphaltic fraction at a temperature of from about 250° to about 400° F.

12. A process for improving the properties of an asphaltic petroleum fraction having a softening point above about 32° F. which comprises reacting with said fraction from about 0.1 to about 10% by weight of an anhydride of a saturated aliphatic dicarboxylic acid containing from 4 to 14 carbon atoms per molecule at a temperature in the range of from about 150° to about 550° F.

13. A process as defined by claim 12 wherein said anhydride is sebacic anhydride.

14. A process as defined by claim 12 wherein said anhydride is adipic anhydride.

15. A process for improving the properties of an asphaltic petroleum fraction having a softening point above about 32° F. which comprises reacting with said fraction from about 0.1 to about 10% by weight of an acid halide of a saturated aliphatic dicarboxylic acid containing from 4 to 14 carbon atoms per molecule at a temperature in the range of from about 150° to 550° F.

16. A process as defined by claim 15 wherein said halide is an acid halide of sebacic acid.

17. A process as defined by claim 15 wherein said halide is an acid halide of adipic acid.

18. A process as defined by claim 15 wherein said halide is an acid chloride.

19. A process as defined by claim 15 wherein said acid halide is sebacyl chloride.

20. A process as defined by claim 15 wherein said acid halide is adipyl chloride.

References Cited in the file of this patent

UNITED STATES PATENTS

| | | |
|---|---|---|
| 2,068,850 | Ellis | Jan. 26, 1937 |
| 2,115,704 | Brownscombe | May 3, 1938 |
| 2,117,177 | Kell | May 10, 1938 |
| 2,347,432 | Polly et al. | Apr. 25, 1944 |
| 2,462,391 | Hartough et al. | Feb. 22, 1949 |
| 2,739,103 | Thompson | Mar. 20, 1956 |
| 2,755,223 | Illman | July 17, 1956 |
| 2,767,123 | Hickok et al. | Oct. 16, 1956 |
| 2,927,077 | Jezl | Mar. 1, 1960 |